US011789431B2

(12) United States Patent
Gomes et al.

(10) Patent No.: US 11,789,431 B2
(45) Date of Patent: Oct. 17, 2023

(54) VIBRATION-BASED MANUFACTURING PLANT CONTROL

(71) Applicant: Andritz Inc., Alpharetta, GA (US)

(72) Inventors: Elisa De Podestà Gomes, Graz (AT); Everton Rocha de Souza, Thal (AT); Matheus Sessim Gomes, Vitória-ES (BR); Hamilton Fabio Borges, Alpharetta, GA (US)

(73) Assignee: Andritz Inc., Alpharetta, GA (US)

( * ) Notice: Subject to any disclaimer, the term of this patent is extended or adjusted under 35 U.S.C. 154(b) by 293 days.

(21) Appl. No.: 17/009,047

(22) Filed: Sep. 1, 2020

(65) Prior Publication Data
US 2021/0072736 A1 Mar. 11, 2021

Related U.S. Application Data

(60) Provisional application No. 62/896,938, filed on Sep. 6, 2019.

(51) Int. Cl.
G05B 19/418 (2006.01)

(52) U.S. Cl.
CPC .......... *G05B 19/41835* (2013.01); *G05B 2219/31372* (2013.01); *G05B 2219/37032* (2013.01)

(58) Field of Classification Search
None
See application file for complete search history.

(56) References Cited

U.S. PATENT DOCUMENTS

| 5,602,757 A | 2/1997 | Haseley et al. |
| 5,963,884 A | 10/1999 | Billington et al. |
| 6,053,047 A | 4/2000 | Dister et al. |
| 6,370,957 B1 | 4/2002 | Filippenko et al. |
| 7,187,773 B2 | 3/2007 | Hamada et al. |

(Continued)

FOREIGN PATENT DOCUMENTS

| EP | 2169497 | 7/2013 |
| JP | 200039914 | 2/2000 |
| WO | WO2018198111 | 11/2018 |

OTHER PUBLICATIONS

PCT International Preliminary Report on Patentability in International Appln. No. PCT/US2020/048899, dated Mar. 17, 2022, 14 pages.

(Continued)

*Primary Examiner* — Sean Shechtman
(74) *Attorney, Agent, or Firm* — Fish & Richardson P.C.

(57) ABSTRACT

Methods, systems, and apparatus, including computer programs encoded on a computer storage medium, that optimize operation of manufacturing plants by adjusting the operation of manufacturing devices in manufacturing plants based on an assessment of their operations. Methods may include obtaining, from a first set of sensors, vibration data specifying vibration in a manufacturing device of a manufacturing plant. The vibration data may be processed to identify a vibration signature. Based on the vibration signature and known vibration signatures, a first operational state of the manufacturing device may be determined. One or more operational characteristics of the manufacturing device may be adjusted based on the first operational state of the manufacturing device, to achieve a second operational state.

26 Claims, 5 Drawing Sheets

(56) References Cited

U.S. PATENT DOCUMENTS

| | | | |
|---|---|---|---|
| 7,308,322 B1 | 12/2007 | Discenzo et al. | |
| 8,660,875 B2 | 2/2014 | Yedatore et al. | |
| 8,855,823 B2* | 10/2014 | Kirihara | G05B 15/02 700/258 |
| 9,109,748 B2 | 8/2015 | Lakomiak et al. | |
| 9,915,584 B2 | 3/2018 | Chernega et al. | |
| 2014/0336791 A1 | 11/2014 | Asenjo et al. | |
| 2016/0282872 A1 | 9/2016 | Ahmed et al. | |
| 2017/0308802 A1 | 10/2017 | Ramsoy et al. | |
| 2018/0282634 A1 | 10/2018 | Van de Cotte et al. | |
| 2019/0025813 A1 | 1/2019 | Cella et al. | |

OTHER PUBLICATIONS

PCT International Search Report and Written Opinion in International Appln. No. PCT/US2020/48899, dated Nov. 20, 2020, 15 pages.
Extended European Search Report in European Appln. No. 20861789.4, dated Sep. 28, 2022, 10 pages.

* cited by examiner

VIBRATION-BASED MANUFACTURING PLANT CONTROL

CROSS-REFERENCE TO RELATED APPLICATIONS

This application claims the benefit under 35 U.S.C. § 119(e) of U.S. Patent Application No. 62/896,938, entitled "VIBRATION-BASED MANUFACTURING PLANT CONTROL," filed Sep. 6, 2019. The disclosure of the foregoing application is incorporated herein by reference in its entirety for all purposes.

BACKGROUND

This specification relates to optimizing operation of manufacturing plants by adjusting the operation of manufacturing devices in manufacturing plants based on an assessment of their conditions and/or operations.

Industrial manufacturing plants (e.g., paper processing plants, metal processing plants) utilize several different types of manufacturing devices (e.g., refiners, pellet mills, centrifuges, drills, etc.) to perform their manufacturing/production operations. A manufacturing device generally includes electrical, mechanical, and/or computing components that can degrade with use over time. If a manufacturing device is not adequately monitored (e.g., for signs of wear and tear) and regularly serviced and/or repaired, the operational efficiency (e.g., the processing or manufacturing output) of the manufacturing device can reduce over time. In some instances, without adequate monitoring or timely maintenance/repairs, the components of a manufacturing device can unexpectedly fail, which can result in an unplanned halting in the operation of the manufacturing device. This in turn can reduce the manufacturing output of the manufacturing plant or in some cases where the failed manufacturing device is critical to the plant's operations, completely cut off the manufacturing output of the manufacturing plant until the failed manufacturing device is repaired/replaced.

SUMMARY

In general, one innovative aspect of the subject matter described in this specification can be embodied in methods that include the operations of obtaining, from a first set of sensors, vibration data specifying vibration in a manufacturing device of a manufacturing plant; processing the vibration data to identify a vibration signature; determining, based on the vibration signature and known vibration signatures, a first operational state of the manufacturing device; and adjusting, based on the first operational state of the manufacturing device, one or more operational characteristics of the manufacturing device to achieve a second operational state. Other embodiments of this aspect include corresponding systems, apparatus, and computer programs, configured to perform the actions of the methods, encoded on computer storage devices. These and other embodiments can each optionally include one or more of the following features.

In some implementations, the methods can include obtaining, from a second set of sensors, sound data representing sound present in the manufacturing plant; processing the sound data to identify a sound signature; and determining, based on the sound signature and the vibration signature, a reinforced operational state of the manufacturing device, wherein adjusting one or more operational characteristics of the manufacturing device comprises adjusting the one or more operational characteristics based on the reinforced operational state of the manufacturing device.

In some implementations, the sound data can represent sound emanating from the manufacturing device for which the vibration data was collected or a different manufacturing device in the manufacturing plant.

In some implementations, determining the first operational state of the manufacturing device can include determining that the operational state is one of a replace device state, normal operational state, abnormal operational state, predicted failure state, or optimization opportunity state.

In some implementations, determining, based on the vibration signature and known vibration signatures, a first operational state of the manufacturing device, can include inputting the vibration signature into a device state model, wherein the device state model is trained on (i) historical vibration data and (ii) corresponding operational states of manufacturing devices, and outputs determined operational states of manufacturing devices based on input vibration signatures; and obtaining, from the device state model and based on the input vibration signature, output specifying the first operational state of the manufacturing device.

In some implementations, determining, based on the sound signature and the vibration signature, a reinforced operational state of the manufacturing device, can include inputting the sound signature and the vibration signature into a device state model, wherein the device state model is trained on (i) historical vibration and sound data and (ii) corresponding operational states of manufacturing devices, and outputs operational states of manufacturing devices based on input vibration and sounds signatures; and obtaining, from the device state model and based on the input vibration and sound signatures, output specifying the second operational state of the manufacturing device.

In some implementations, the methods can include the operations of generating a visualization indicating expected operational performance of the manufacturing device based on the first operational state, the second operational state, or both.

In some implementations, obtaining the vibration data can include collecting vibration data over a specified period of time and processing the vibration data to identify a vibration signature can include determining the vibration signature based on a pattern of vibration attributes over the specified period of time.

In some implementations, determining a first operational state of the manufacturing device can include inputting the vibration signature into a device state model; and obtaining output from the device state model indicating that the device is determined to have the first operational state.

Particular embodiments of the subject matter described in this specification can be implemented to realize one or more of the following advantages. The innovations described in this specification provide assessment of the current conditions/operations of manufacturing devices. Conventionally, plant operators periodically perform visual inspections of manufacturing devices and/or semi-automated diagnostic tests (which may require taking the manufacturing device offline). These inspections/tests are limited in that they provide fewer snapshots in time of the device's condition/operation and even then, only provide limited information about the device's condition/operation (e.g., owing to the fact that inspecting certain components of a manufacturing device may be difficult due to their inaccessibility) and may affect the productivity of the plant (e.g., as a result of shutting down the manufacturing device). As a result, conventional monitoring efforts for manufacturing devices consume a significant amount of time and resources and generally do not provide a timely or an accurate enough assessment of the current operational state of the manufacturing device (or even an overview of the device's operational state over time).

In contrast, this specification provides real-time (or predictive) and accurate assessments of the operational state of the manufacturing device based on real-time sensor data (e.g., data from sound and/or vibration sensors distributed around the manufacturing plant) and model-based analysis (e.g., models that are trained on historic sensor data and their corresponding operational states) of the sensor data. This not only reduces the amount of time and resources required to perform the monitoring, it also provides a real-time and accurate assessment of the condition/operation of the manufacturing device. Moreover, such real-time monitoring does not require shutting down or otherwise removing the manufacturing device from service, which ensures that the plant's output is not detrimentally affected by such monitoring.

In fact, the monitoring and analysis discussed herein can result in a self-healing manufacturing system that can detect and/or predict problems associated with one or more devices that are part of the manufacturing system, and initiate change that can correct the problems, or mitigate the problems until the problems can be more fully addressed. For example, this specification describes techniques that enable an automated adjustment of operational characteristics of the manufacturing device based on the current operational state of the device (which can include the actual or predicted current operational state of the device). As such, the innovations described in this specification enable fine tuning operational characteristics of the manufacturing device for a particular operational state of the device (as opposed to adjusting operational characteristics at particular time intervals, which may not align with the adjustment/s required for the current operational state of the device). Relatedly, the techniques described in this specification enable automated adjustments of the device's operational characteristics in a manner that mitigates any expected capacity or output reductions resulting from the current operational state (or predicted operational state) of the manufacturing device. For example, if a motor is expected to fail within one month at the current operational state of the manufacturing device, the techniques described in this specification can, e.g., reduce the operational speed of the motor by 25% to prolong the operation of the motor with limited impact (e.g., 5-10%) on the device's manufacturing/production/processing output, or make other appropriate changes. Moreover, the automated adjustments of operational characteristics of manufacturing devices also reduce the resources (e.g., personnel and computing resources), as conventionally required, to translate/convert conventional monitoring/inspection results into tangible operational characteristics adjustments that need to be implemented.

Moreover, the innovations described in this specification can utilize ultra microphones, which enable identification of operational states (e.g., defects, failures) that may not otherwise be detectable based on a human operator's supervision. Specifically, ultra microphones generally have a frequency range (e.g., 100 kHZ) that is much higher than the audible range for a human (or even regular microphones). As a result, the ultra microphones can detect sounds that humans (or even regular microphones) cannot detect, which in turn can be used to determine operational states of manufacturing devices (e.g., defects, failures, etc.), which may otherwise go undetected by human operators.

In addition, the innovations described in this specification can improve computation efficiency of the overall system by offloading sensor data processing to a plant management system—which is generally separate from the sensors and/or gateways deployed in the manufacturing plant. This enables utilizing low cost vibration and/or sound sensors that have lower processing requirements and only require small batteries, as compared with more expensive vibration and sound sensors that include more complex circuitry/firmware and larger batteries (which are generally needed to perform most of the sensor data processing at the sensor itself).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally relates to techniques for optimizing operation of manufacturing plants and in particular, describes a plant management system that adjusts the operational characteristics of manufacturing devices in manufacturing plants based on an assessment of real-time data representing the devices' conditions/operations, historical data, and/or predicted data.

As further described below and in more detail throughout this specification, the plant management system collects and processes information from different types of sensors, such as vibration sensors (e.g., accelerometer, proximity sensors, etc.) and/or sound sensors (e.g., high frequency microphones, such as ultra microphones) distributed at different locations in the manufacturing plant. The plant management system processes the sound data to generate a sound signature and the vibration data to generate a vibration signature. These signatures are analyzed using, for example, a model (e.g., a supervised or unsupervised machine learning model, a rules-based engine) that determines the operational states of the manufacturing devices in the plant based these signatures. As described in this specification, a manufacturing device's operational state indicates a state or health of the manufacturing device's operation. Example operational states include a replace device state, a normal operational state, an abnormal operational state, a predicted failure state, a maintenance state, or an optimization opportunity state, which are further described below. Other states can also be defined as appropriate and/or desired.

Based on the determined operational state of the manufacturing device, the plant management system adjusts one or more operational characteristics of the manufacturing device to achieve a different operational state (e.g., adjust operational characteristics to change from a maintenance required state to a normal state). As used in this document, an "operational characteristic" refers to characteristic of a manufacturing device that, when adjusted, affects the operation of the manufacturing device (or some component thereof) and can include, for example, speed, frequency, power input or output, etc. For example, the techniques described in this specification can be used to adjust the speed of a defective or deteriorating motor in a manufacturing device, to prolong its operation, e.g., at least until a replacement motor can be acquired and installed.

In some instances, the plant management system can also generate a visualization (e.g., graphical representation), which can be accessed by plant operators at operator devices (e.g., computing devices). The visualization provides, for example, text and/or graphs (or other graphical information) describing and/or showing the current operational state of the manufacturing device, the expected operational state of the manufacturing device over time, and the adjustment actions and/or operational characteristics that the plant management system is recommending for adjustment.

These and other features are more fully described in the descriptions below.

Figure 1:
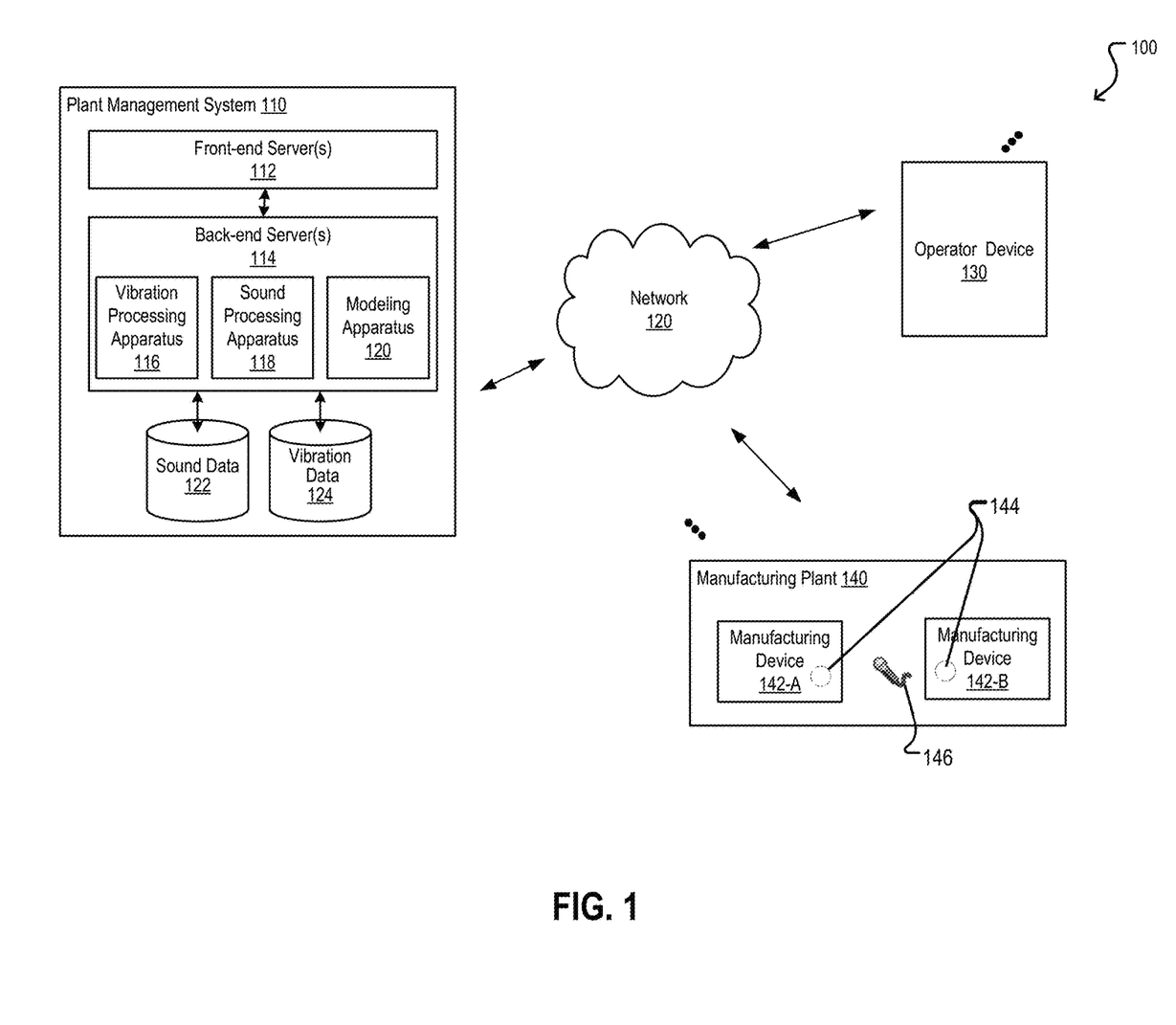
FIG. 1 is a block diagram of an example environment in which operations of manufacturing devices in a manufacturing plant are monitored and adjusted.

FIG. 1 is a block diagram of an example environment 100 in which a plant management system 110 monitors and adjusts the operations of manufacturing devices in a manufacturing plant.

The example environment 100 includes a network 120, such as a local area network (LAN), a wide area network (WAN), the Internet, a mobile network, or a combination thereof. The network 150 connects the plant management system 110, one or more operator devices 130, and one or more manufacturing plants 140. Although the below description describes a single manufacturing plant 140 being controlled/monitored by the plant management system 110, in some implementations, multiple manufacturing plants 140 may be controlled/monitored by the plant management system 110.

Manufacturing plant 140 (which are also referred to as "plant" in this specification) is an industrial site at which goods, products, or other materials are manufactured, produced, or otherwise processed. In general, a manufacturing plant includes multiple manufacturing devices (which are also referred to in this specification as machines) that are used in the manufacturing/production process. Although the manufacturing plant 140 illustrated in FIG. 1 includes two manufacturing devices 142-A and 142-B, manufacturing plants can include any number and type of manufacturing devices that are required to perform the appropriate manufacturing/production processes of the plant 140.

Each of the manufacturing devices 142-A and 142-B has a vibration sensor 144 located on it or near it. Vibration sensors 142-A and 142-B can include accelerometers or proximity sensors. In some implementations, additional vibration sensors can be placed on each of the manufacturing devices. For example, vibration sensors may be placed next to or near bearings, shafts, motors, etc.

Manufacturing plant 140 also includes a sound sensor 146. Sound sensor 146 can include any sensor that can record sounds, such as a microphone. The sound sensor 146 is disposed at a location in the manufacturing plant 140 from where it can record sounds in the plant. In some implementations, additional sound sensors 146 can be deployed around the plant, some of which are in close proximity to a set of manufacturing devices and some that are located on one or more manufacturing devices.

The example environment 100 also includes one or more operator devices 130. An operator device 130 is an electronic device that an operator of the plant 140 uses to, e.g., access operations of the plant, generate reports based on data (e.g., vibration and sound data for a particular manufacturing device over a particular period) stored in the plant management system 110 (as described below), and to initiate or schedule actions that result in effecting control over certain aspects of the plant 140 (e.g., adjusting certain operational characteristics of the manufacturing devices in the plant 140). Example operator devices 130 include personal computers, tablet devices, mobile communication devices, digital assistant devices, augmented reality devices, and other devices that can send and receive data over the network 104. An operator device 130 typically includes a user application, such as a web browser, to facilitate the sending and receiving of data over the network 120, but native applications executed by the user device 130 can also facilitate the sending and receiving of content over the network 120.

The example environment 100 also includes a plant management system 110, which generally monitors and controls the operations of the different manufacturing devices 142-A, 142-B of the plant 140. The plant management system 110 obtains data from the different sensors, e.g., vibration sensors 144 and sound sensor 146—located in the manufacturing plant 140. Data from the sensors can be transmitted via a communication interface (such as Bluetooth or other nearfield communication interface) to a gateway (e.g., a wireless gateway) within the plant 140, which in turn transmits this data to the plant management system 110.

As further described with reference to FIG. 2, upon receiving this data, the plant management system 110 processes this data to determine the current operational state of the manufacturing devices (e.g., 142-A and 142-B) in the plant 140. The plant management system 110 also determines the appropriate operational characteristics of manufacturing devices 142-A and 142-B in the plant 140 based on the current operational state of the plant.

The plant management system 110 includes one or more front-end servers 112 and one or more back-end servers 114. The front-end servers 112 can transmit data to, and receive data from, operator devices 130 over the network 120. For example, the front-end servers 112 can provide, to an operator application 132 executing on an operator device 130, interfaces or data for presentation with the interfaces. The front-end servers 112 can also receive data specifying operator's interactions with the interfaces of the application 130. The front-end servers 112 can update the interfaces, provide new interfaces, and/or update the data presented by the interfaces based on user interactions with the application 132.

The front-end servers 112 can also communicate with the back-end servers 114. For example, the front-end servers 112 can identify data that is to be processed by the back-end servers 114, e.g., data specifying operational characteristics to be updated in manufacturing devices, and provide the identified data to the back-end servers 114. The front-end servers 112 can also receive data from the back-end servers 114, e.g., data regarding current operational states of different manufacturing devices or summary of vibration and sound data for a manufacturing device, and transmit the data to the operator device 130 over the network 120.

The back-end servers 114 include a vibration processing apparatus 116, a sound processing apparatus 118, and a modeling apparatus 120. The operations of these engines is summarized below and are described in detail with reference to FIGS. 2 and 3. The vibration processing apparatus 116 processes the vibration data received from the vibrations sensors 144 and identifies vibration signatures. The sound processing apparatus 116 processes the sound data received from the sound sensor 146 and identifies sound signatures. The modeling apparatus 118 accepts the vibration and sound signatures for a manufacturing device as inputs to a device state model that output the current operational state of the device. In some implementations, the modeling apparatus 118 also includes a device adjustment model that accepts the device's current operational state to determine an adjustment action, including optimizations (e.g., lubrication), maintenance (e.g., filter change, fluid replacement, etc.), or other corrective action (e.g., replacement part needed).

The sound data storage device 122 stores, for each manufacturing device, the sound data received from the sound sensor 146, the sound signatures associated with the device, the corresponding operational state of the manufacturing device, and any identified adjustment action. Similarly, the vibration data storage device 124 device stores, for each manufacturing device, the vibration data received from the vibration sensor 144, the vibration signatures for the device, the corresponding operational state of the manufacturing device, and any identified adjustment actions. In some implementations, the sound data storage device and the vibration storage device can be a single storage device, instead of two separate storage devices. Storage devices 122 and 124 can each include one or more databases (or other appropriate data storage structures) stored in one or more non-transitory data storage media (e.g., hard drive(s), flash memory, etc.).

Figure 2:
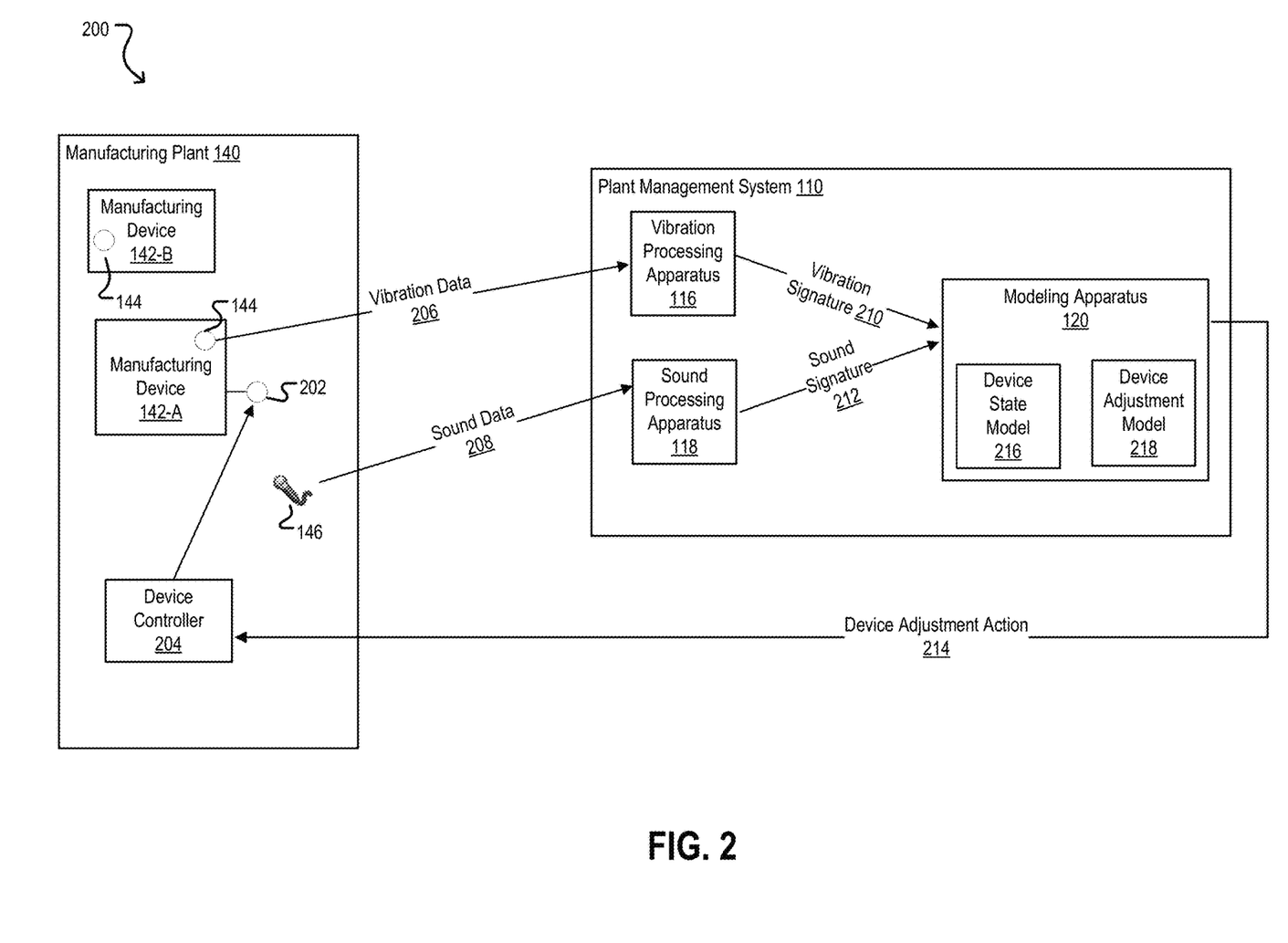
FIG. 2 is a block diagram illustrating the components of FIG. 1 that monitor the operational state of a manufacturing device and adjust the operational characteristics of the device based on its operational state.

FIG. 2 is a block diagram illustrating the components of FIG. 1 that monitor the operational state of manufacturing device 142-A and adjust the operational characteristics of this device based on its operational state.

As shown in FIG. 2, the vibration sensor 144 located on manufacturing device 142-A constantly or periodically (e.g., every second, every minute, every five minutes, every hour, etc.) records the vibration data for the manufacturing device 142-A and transmits (as described above with reference to FIG. 1) this vibration data 206 to the plant management system 110. Similarly, the sound sensor constantly or periodically (e.g., on the same periodic basis as vibration sensor), 146 records the sound in the plant 140 (or particular parts of the plant) and transmits this sound data 208 to the plant management system 110. Although sound data 208 and vibration data 206 are shown as being transmitted separately, this data can be transmitted to the plant management system 110 in the same transmission.

If the vibration data 206 and the sound data 208 are transmitted together, the plant management system 110, upon receiving this data, splits the jointly-transmitted data into vibration data 206 and the sound data 208. In some implementations, the plant management system 110 splits the data into vibration data 206 and sound data 208 based on, e.g., metadata included with the jointly transmitted data that identifies each dataset (e.g., sound data may be identified with a <sound> tag and a vibration data may be identified with a <vibration> tag).

In some implementations, the transmitted sound and vibration data (either as a joint transmission or as separate transmission) also identifies the sensor with which each respective data is associated. For example, the vibration data can include metadata in the form of a tag that uniquely identifies the sensor (e.g., "Sensor ID=32114") that recorded the data.

Each sensor in the plant 140 is associated with (i.e., assigned to) at least one manufacturing device. For example, a vibration sensor is generally located on or near the manufacturing device is assigned to this device. Sound sensors can be assigned to a single manufacturing device, a subset of manufacturing devices in the plant 140, or all the manufacturing devices of the plant. This is because a sound signature can represent the sound emanating from the manufacturing device (e.g., in the case where a microphone is placed on the manufacturing device), the sound recorded from the vicinity of the manufacturing device (e.g., in the case where a microphone is located next to one or more machines), or the sound recorded by a sensor in the plant 140, which may not be in the vicinity of the manufacturing device (e.g., in the case where a microphone is located near a circuit breaker or fuse box, which may be at a distant location from the manufacturing device). When the sound is recorded by a sensor that is located on a manufacturing device, the sound sensor is assigned to that manufacturing device. When the sound is recorded from the vicinity of one or more manufacturing device, the sound sensor may be assigned to each of these devices. When the sound is recorded by a sensor that is distant from any of the manufacturing device, the sensor can be assigned to each of the manufacturing devices in the plant 140.

An operator of the plant 140 can configure the plant management system 110 to store, e.g., in a database, the associations between different sensors and the manufacturing devices (as described above). As a result, when the sensor data is received from the plant 140 (e.g., as a joint transmission including sound and vibration data, or as separate transmissions of sound data 208 and vibration data 206), the plant management system 140 uses the received sensor identifier to look up the associated manufacturing device/s corresponding to the sensor data.

Once the manufacturing device/s associated with (i.e., assigned to) the received sensor data is identified, the plant management system 110 routes the vibration data 206 to the vibration processing apparatus 116 and the sound data 208 to the sound processing apparatus 118.

The vibration processing apparatus 116 processes the vibration data to identify a vibration signature 210. A vibration signature (which may also be referred to as a vibration band) can be a signature derived from an assessment of the recorded vibrations at a particular snapshot in time or based on assessments of recorded vibrations over certain time intervals (e.g., ten seconds, one minute, etc.). For example, the processing includes monitoring and aggregating particular vibration frequencies recorded by the different vibration sensors on the manufacturing device over a certain time period. As another example, the processing includes performing a fast Fourier Transform (FFT) of the vibration data, which generates a vibration spectrum (e.g., a plot curve) over a suitable (N) number of discrete points that determine, among other characteristics, the velocity, acceleration, RMS, etc.

In some implementations, the vibration signature can be a mathematical model representing the vibration that was captured or recorded. Alternatively, or additionally, the vibration signature can be a sparse representation of the vibrations detected. The sparse representation can include, for example, a combination of values that respectively represent frequency information, phase information, amplitude information, or other information (e.g., velocity, acceleration, root mean square (RMS)) about the characteristics of the detected vibration. In some implementations, the vibration signature can be the digitized real-time vibration data captured over a certain period.

Similarly, the sound processing apparatus 118 processes the sound data to identify a sound signature 212 (which may also be referred to as a sound band), which too can be derived from an assessment of the recorded sounds at a particular snapshot in time or based on assessments of recorded sounds over certain time intervals (e.g., ten seconds, one minute, etc.). The sound data processing can include a similar time-frequency analysis or an FFT analysis, as described above with reference to the vibration frequency analysis. As another example, the sound data can be processed to generate sound maps that identify locations where certain sounds are concentrated. Analyzing such sound maps can, e.g., be used to identify shifts or changes in sound locations, which can suggest, e.g., tears or ruptures in components of a manufacturing device.

In some implementations, the sound signature can be a mathematical model representing the sound that was captured or recorded. Alternatively, or additionally, the sound signature can be a sparse representation of the sounds detected. The sparse representation can include, for example, a combination of values that respectively represent frequency information, phase information, amplitude information, or other information (e.g., velocity, acceleration, root mean square (RMS)) about the characteristics of the detected sound. In some implementations, the sound signature can be the digitized real-time sound data recorded over a period of time.

The vibration signature 210 and/or the sound signature 212 are then processed by the device state model 216 of the modeling apparatus 120 to determine an operational state of the manufacturing device 142-A. As used in this specification, an operational state of the manufacturing device is an indicator of the state or health of the device's operation. Example operational states include replace device state, normal operational state, abnormal operational state, corrective action required failure state, maintenance state, and optimization opportunity state. Each of these states is briefly described below. (1) The normal operational state indicates that the device is healthy and operational, and that no service, maintenance, or corrective action is necessary. (2) The replace device state indicates that a particular manufacturing device (or a component of such device) has failed or is expected to fail within a certain period (e.g., five days, three months, etc.). This state can also identify the reason/cause of the failure or anticipated failure. (3) The abnormal device state indicates that the device state model 216 did not identify with sufficient certainty (e.g., with a probability meeting or exceeding a certain threshold, such as 80%) any one operational state. (4) The maintenance required state indicates that the manufacturing device has a maintenance issue that requires corrective action. This state also indicates the maintenance issue and the predicted performance or operation of the manufacturing device until a failure event. (5) The optimization opportunity state indicates that the manufacturing device has normal operation, but performance or operation of the device could be optimized by taking some action (e.g., increasing/decreasing power to the unit, lubricating, adjusting input to/output from the unit. In some implementations, the plant management system 110 can be configured to have fewer operational states or additional operational states.

For each manufacturing device, the vibration processing apparatus 116 sends the vibration signature 210 for that device to the device state model 216 of the modeling apparatus 120. The device state model 216 accepts a vibration signature as an input, based on which it outputs the operational state of the manufacturing device associated with the vibration signature. The device state model 216 can be implemented as a lookup table, a machine learning model (e.g., supervised or unsupervised machine learning model) or another appropriate statistical model (e.g., a rules-based model) that is trained on historical vibration signatures of manufacturing devices and the corresponding operational states of these devices (e.g., stored in storage devices 122 and 124). As shown in FIG. 2, based on the input vibration signature 210, which is associated with manufacturing device 142-A, the device state model 216 outputs the determined operational state of this device.

In some implementations where the device statement model 216 is implemented as a lookup table, the lookup table stores vibration signatures of manufacturing devices and the corresponding operational states of these devices. When a vibration signature of a particular manufacturing device is obtained, the vibration signature and the particular manufacturing device are compared with the vibration signatures and the manufacturing devices stored in the lookup table. If the comparison yields a match (e.g., a matching vibration signature for the same device or the type of device), the corresponding operational state value stored in the lookup table is retrieved and identified as the current operational state of the particular manufacturing device. Additionally, or alternatively, the lookup table can also store sound signatures for manufacturing devices along with the vibration signatures. In such implementations, the sound and vibration signatures for a particular manufacturing device are input to the lookup table to obtain the corresponding operational state for that manufacturing device. Alternatively, one lookup table may store sound signatures for manufacturing devices in association with the device operational states and a separate lookup table may store vibration signatures for manufacturing devices in association with the device operational states. To the extent that the operational state output by these separate lookup tables varies, such variance can be resolved or reconciled in the manner described below.

In some implementations where the device state model 216 is implemented as a machine learning model, the machine learning model can be trained on a set of vibration signatures and the corresponding labels regarding the current operational state of the machine. For example, the vibration signatures can be labeled with information about the current operational state of a particular manufacturing device, and subsequently labeled with additional state information for the particular manufacturing device. This enables the device state model 216 to associate each particular vibration signature with the current operational state of the particular manufacturing device as well as future operational states of the manufacturing device. In some implementations, the device state model 216 can accept a vibration signature as well as a rate of change in the vibration signature over a certain period to further improve the prediction performance of the model. For example, the device state model 216 can be trained on training data, where each training record of the training data includes a vibration signature, a change (and/or rate of change) in the vibration signature over time, and the corresponding labels indicating the current operational state of a particular manufacturing device. As a result of such training, the device state model 216 can more accurately determine the current operational state of the manufacturing device (as compared with a model that is only trained with vibration signatures, as described above). In some implementations, the device state model 216 uses vibration signatures acquired over a certain period (e.g., using vibration signature data that can include timestamps) to predict a future state of the particular manufacturing device, and in particular, output a prediction as to when (e.g., how far in the future) the particular manufacturing device will arrive at the predicted future operational state.

In some implementations, instead of just using vibration signatures (and in some instances, the change or rate of change in the vibration signatures), the device state model 216 uses both sound and vibration signatures (and in some instances, the changes or rates of changes in such signatures) as inputs, based on which it outputs the operational state of the manufacturing device. In such implementations, the device state model 216 is trained on historical vibration and sound signatures (and in some instances, the changes and/or rates of change in the signatures) associated with manufacturing devices and the corresponding operational states of these devices (e.g., stored in storage devices 122 and 124). For example, for manufacturing device 142-A, the plant management system 110 inputs the sound signature 212 (received from the sound processing apparatus 118) and the vibration signature 210 (received from the vibration processing apparatus 116), to the device state model 216, which in turn outputs the operational state for this manufacturing device. In such implementations, the device state model 216 can be trained to output the current operational state of the particular manufacturing device, the future operational state(s) of the manufacturing device, as well as a prediction as to when (e.g., how far in the future) the particular manufacturing device will arrive at the predicted future operational state (as described above).

In some implementations, the device state model 216 can include two sub-models: one that determines operational states of manufacturing devices based on sound signatures received from the sound processing apparatus 118 and the other that determines operational states of manufacturing devices based on vibration signatures received from the vibration processing apparatus 116. The sound sub-model can be a machine learning model (e.g., supervised or unsupervised machine learning model) or another appropriate statistical model (e.g., a rules-based model) that is trained on historical sound signatures associated with/assigned to manufacturing devices (and in some instances, the change or rate of change of in the sound signatures over time) and the corresponding operational states of these devices (e.g., stored in storage devices 122 and 124). Similarly, the vibration sub-model, which can also be a machine learning model (or another appropriate statistical model) can be trained on historical vibration signatures for manufacturing devices (and in some instances, the change or rate of change of in the sound signatures over time) and the corresponding operational state of these devices (e.g., stored in storage devices 122 and 124). In such implementations, each sub-model is trained to output the current operational state of the particular manufacturing device, the future operational state(s) of the manufacturing device, as well as a prediction as to when (e.g., how far in the future) the particular manufacturing device will arrive at the predicted future operational state (as described above).

In such implementations, each sub-model outputs the determined operational state of the manufacturing device based on the input sound or vibration signature. If the operational states determined by both sub-models match (i.e., each model outputs the same operational state of the manufacturing device), the modeling apparatus 120 determines that a reinforced (or in other words, a high confidence) operational state is obtained for the manufacturing device. If the operational states determined by the sub-models does not match (i.e., each model outputs a different same operational state of the manufacturing device), the modeling apparatus 120 may determine that the operational state is an abnormal state (as described above).

Alternatively, the modeling apparatus 120 can resolve or reconcile the disparity between the operational states output by the two sub-models by applying certain rules (or analyzing certain factors) that result in the selection of one of the operational states determined by the sub-models. As one approach, the modeling apparatus 120 can resolve the disparity by giving more weight to the operational state determined by one sub-model over the other. As another approach, the modeling apparatus 120 can resolve the disparity by giving more weight to the operational state that is of higher criticality. For example, the modeling apparatus 120 can apply more weight to the sound model if it determines a replace device state (e.g., based on a power spike that resulted in a fuse being blown) as compared to an abnormal state determined based on the vibration sub-model. As another approach, the modeling apparatus 120 can resolve the disparity by selecting the operational state that is the same as the last n number of operational states determined for the manufacturing device.

In some implementations, in addition to accepting sound and/or vibration signatures as an input, the device state model may utilize additional operational characteristics about the manufacturing and/or the component of the manufacturing device in determining an operational state of the manufacturing device. For example, the device state model can be trained to consider additional operational characteristics, e.g., operational temperature of the machine, machine load, hours of operations, etc., along with the vibration and/or sound signatures to generate a more refined operational state. Thus, by using the sound and/or vibration signatures along with the operational characteristics of the manufacturing device (and/or its subcomponents), the device state model can output a more accurate operational state of the manufacturing device. For example, the device state model may be trained to recognize that a manufacturing device is operating normally even when its vibrations are higher than an operational range because the machine is operating at a full load (as opposed to 70-80% of the load, in which case the vibrations are within the expected operational range).

Based on the determined operational state for a manufacturing device, the modeling apparatus 120 determines the appropriate adjustment/s of operational characteristics for the manufacturing device. In some implementations, the device state model 216 outputs the determined operational state of the manufacturing device to the device adjustment model 218. The device adjustment model 218 takes as input the determined operational state of the manufacturing device, based on which it outputs a device adjustment action. As used in this specification, a device adjustment action is a command or an instruction that specifies the adjustment of an operational characteristic of the manufacturing device. For example, a device adjustment action can be an instruction to reduce the operational speed of a motor of the manufacturing device. As another example, a device adjustment action can be an instruction to adjust the power draw of a manufacturing device. Further adjustments can include an instruction that results in a physical manipulation of some component on the manufacturing device (e.g., causing a motor or a robot to move a particular lever or knob).

The types of device adjustment actions can include recommendations or instructions to, e.g., add a certain (e.g., an optimal amount of oil based on the device adjustment model) oil at the bearing, balance the manufacturing device, change the operation point of a manufacturing device (or a component thereof), change the sealing, re-align the bearing, reduce or increase rotational speed, change filters, and adjust the gap distance for a specific bearing. Other types of device adjustment actions can be specified for particular device states.

In some implementations, the device adjustment model 218 can be implemented as a lookup table that associates operational states with corresponding device adjustment actions. In some implementations, the device adjustment model 218 can be implemented as a rules-based model (or another appropriate statistical model) for which a set of rules specify the appropriate device adjustment action for particular operational states. In some implementations, the device adjustment model 218 can also be implemented as a machine learning model (e.g., a supervised or unsupervised model) that is trained on known device operational states and corresponding device adjustment actions (e.g., stored in storage devices 122 and 124). The machine learning model may be preferred in scenarios involving several operational states and several different adjustment actions, in which case, recording all possible relationships and/or rules between operational states and adjustment actions may not be feasible.

The modeling apparatus 120 transmits the device adjustment action command 214 to the plant 140. In particular, the device controller 204 of the plant 140 receives, over network 120, the device adjustment action 214 from the modeling apparatus 120. The device controller 204 converts the device adjustment action into an electrical signal that can be processed by the manufacturing device. For example, if the device adjustment action requires the motor speed of a manufacturing device to be reduced by 50%, the device controller 204 can send a signal to the manufacturing device 142-A, e.g., specifying the frequency of the motor that corresponds to 50% of the current operational speed. Upon receiving this signal, the manufacturing device adjusts the specified operational characteristic (e.g., adjusting operational frequency or rotational speed of a motor) by adjusting controls (e.g., changing physical positions of mechanical components, e.g., knobs, levers, and/or modifying settings for electric or digital components) of the manufacturing device.

In some implementations, the device adjustment model 218 determines an adjustment action, which results in adjusting one or more operational characteristics of the manufacturing device. This in turn results in the manufacturing device achieving (or expecting to achieve) a different operational state. For example, an adjustment action that results in adjusting one or more operational characteristics (such as, e.g., reduce motor speed) can alter a device's operational state from a replace device state (e.g., where the device is expected to fail in three days) to a replace device state (e.g., where the device is expected to fails in seven days). As another example, an adjustment action that results in adjusting one or more operational characteristics (e.g., changing oil filter for engine) can alter a device's operational state from maintenance required to normal. As another example, an adjustment action that results in adjusting one or more operational characteristics (e.g., apply lubrication, supply more cooling to device) can alter a device's operational state from optimization opportunity state to a normal state.

In some implementations, an operator can pre-configure, e.g., as a lookup table, the expected operational states to be achieved for a particular operational state and adjustment action. In other implementations, a statistical model (e.g., a machine learning model) can be trained to determine expected outcomes based a particular operational state and adjustment action. Such a model can be trained on known pairs of operational states and adjustment actions and the corresponding operational states resulting from such adjustments (e.g., data stored in storage devices 122 and 124). As a result, an adjustment action and the current operational state for a device may be input to such a model to obtain the expected operational state for the device. The expected operational state for the manufacturing device can then be stored in the storage devices 122 and/or 124.

In some implementations, the device adjustment model 218 can determine that no adjustment action is necessary. For example, if the device's operational state is determined to be normal or abnormal, the device adjustment model 218 can output that no further action is necessary, in which case, no adjustments to operational characteristics are made. As another example, if the device's operational state is determined to be replace device, depending on the cause of the issue, the device adjustment model 218 can determine that no operational characteristics need to be adjusted and instead, the operator must order a replacement device.

In the preceding paragraphs, the transmission of the device adjustment action to the plant 140 (i.e., the device controller 204) results in automatic adjustments of the device's operational characteristics (in the manner described above). Although certain operational characteristics can automatically be adjusted, in some scenarios, a plant operator may nevertheless configure the plant management system 110 to seek confirmation from the operator (e.g., by sending a request to the operator device 130 and waiting for a response from the operator) before sending the command to the device controller 204 to automatically implement the adjustments to the operational characteristics.

In some implementations, the device adjustment actions can also specify certain actions that require operator intervention, e.g., physically replace parts and/or shut down the manufacturing device during repair. In such scenarios, the plant management system 110 sends a message to the application running on the operator device 130, indicating the necessary operator intervention for the repair/corrective action. As a result, the operator performs the necessary intervening steps before signaling to the plant management system (e.g., via a confirmation sent from the operator device 130 to the plant management system) to send the device adjustment action to the device controller 204 to implement the remaining operational characteristic adjustments required to complete the repair/corrective action.

As described above, the plant management system 110 determines the vibration and sound signatures associated with a manufacturing device, the current operational state of the manufacturing device, the adjustments to the device's operational characteristics, and the intended operational state. This information can be stored for each manufacturing device in the plant in a single storage device, or alternatively, in the sound data storage device 122 and the vibration data storage device 124.

In some implementations, the data stored in the sound data storage device 122 and the vibration data storage 124 can be used to generate visualizations that are presented in applications executing on the operator's device 130. For example, the generated visualizations can provide text and/or graphs (or other graphical information) that use the data stored about a device in these storage devices to provide operational reports specifying the current operational state of the device, the expected operational state of the device, any required adjustment actions, and expected operation of the device over time (with or without implementing the adjustment action). An example of such a visualization is shown and described with reference to FIG. 4.

In some implementations, the plant management system 110 can also transmit the current operational state (as determined by the device state model 216) of a particular manufacturing device to the device controller 204. The device controller 204 in turn provides this information to the particular manufacturing device, which uses this information to provide an alert. The alert can include illuminating lights on (or near) the manufacturing device (e.g., a "status" LED) and/or generating sounds (e.g., alarms) based on the determined current operational state. For example, a green LED can be illuminated for the "normal operational" or "optimization opportunity" states, a yellow LED can be illuminated for the "abnormal operation" or "maintenance required" states, and a red LED can be illuminated for the "replace device" state. As another example, different types of sounds can be sounded for each operational state of the device. Alternatively, or in addition to generating sounds and illuminating lights, the plant management system 110 can generate a notification indicating the current operational state of one or more manufacturing devices of the plant 140 and transmit this notification via an appropriate communication channel (e.g., a text message, email, or other visualization) to an appropriate application executed at the operator device 130.

Figure 3:
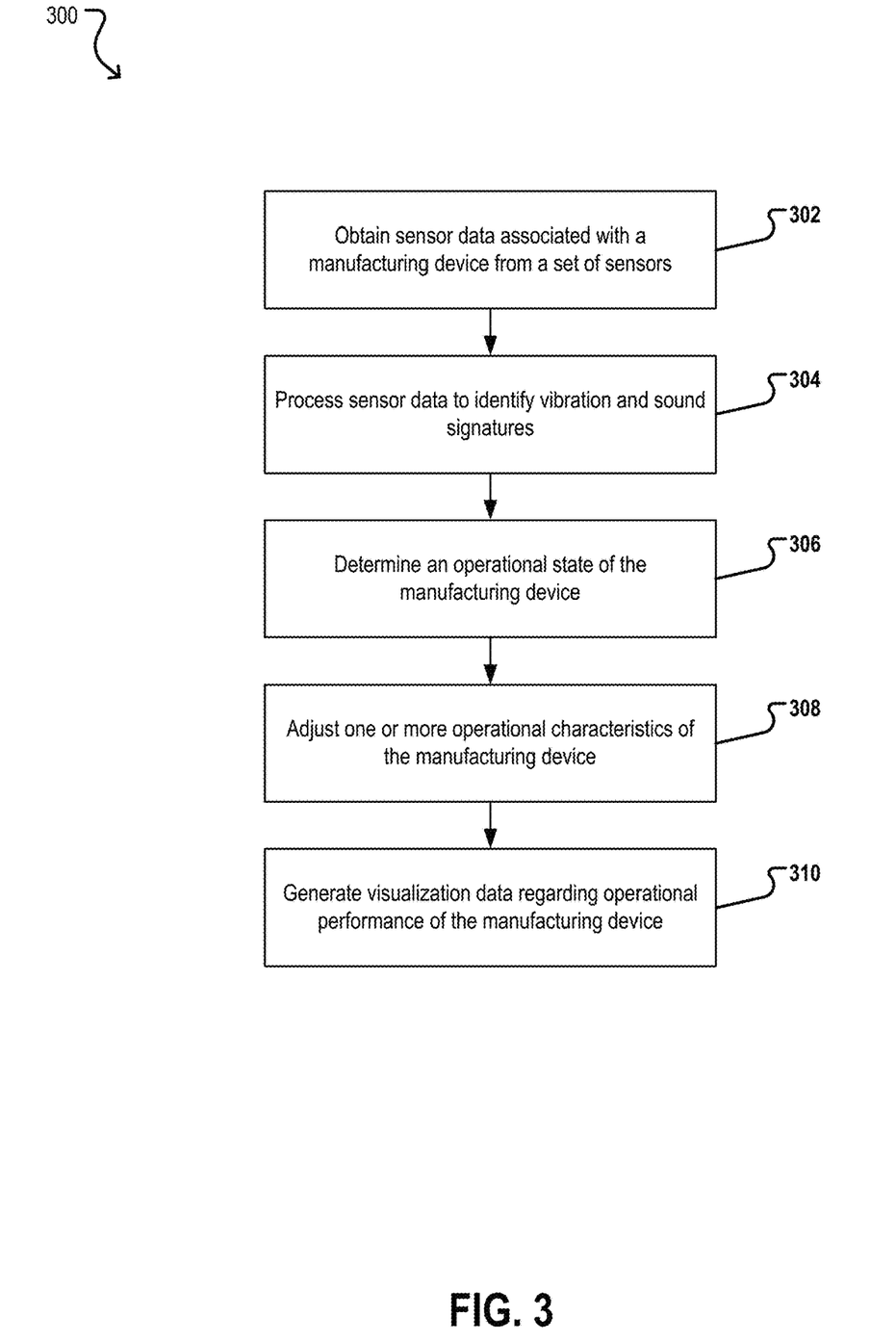
FIG. 3 is a flow chart of an example process for monitoring the operational state of a manufacturing device and adjusting the operational characteristics of this device based on its operational state.

FIG. 3 is a flow chart of an example process 300 for monitoring the operational state of a manufacturing device and adjusting the operational characteristics of this device based on its operational state. Operations of the process 300 can be implemented, for example, by the system components shown in FIGS. 1 and 2, and/or one or more data processing apparatus. In some implementations, operation of the process 300 can be implemented as instructions stored on a non-transitory computer readable medium, where execution of the instructions by one or more data processing apparatus cause the one or more data processing apparatus to perform operations of the process 300.

Sensor data associated with a manufacturing device can be collected from a set of sensors (302). The set of sensors can include vibration sensors (e.g., accelerometers, proximity sensors) and sound sensors (e.g., microphones). As described above with reference to FIGS. 1 and 2, the sound sensors record sounds (e.g., sounds emanating from a manufacturing device, sounds in the manufacturing plant) and the vibration sensor records vibrations of the manufacturing device.

The sensor data obtained at operation 302 is processed to identify vibration and sound signatures (304). As described above with reference to FIGS. 1 and 2, the sensor data—including the sound data and the vibration data—associated with the manufacturing device is transmitted to the sound processing apparatus 118 and the vibration processing apparatus 116 of the plant management system 110, which then process the received data to generate sound and vibration signatures, respectively.

An operational state of the manufacturing device is determined based on the vibration and/or sound signatures (306).

As described above with reference to FIGS. 1 and 2, the vibration signature associated with the manufacturing device is input to a device state model 216, which outputs the current operational state of the manufacturing device. In some implementations, a separate sub-model of the device state model also accepts the sound signature as an input and outputs an operational state for the device, which is then reconciled and/or combined with the operational state determined based on the vibration signatures (as described above with reference to FIGS. 1 and 2). In other implementations, both the vibration and sound signatures are input to the device state model 216, which then determines an operational state of the manufacturing device (as described above with reference to FIGS. 1 and 2) for these dual inputs.

One or more operational characteristics of the manufacturing device are adjusted based on the determined operational state (308). As described above with reference to FIGS. 1 and 2, the device adjustment model 218 accepts as input the determined operational state for the manufacturing device, based on which it generates an adjustment action command 214. The device adjustment model 218 transmits this adjustment action command, via network 120, to the device controller 204 of the plant 140, which in turn generates appropriate signals to adjust one or more operational characteristics of the manufacturing device (as described above with reference to FIGS. 1 and 2). In some implementations, the device adjustment model 218 outputs an adjustment action command that results in changing the device's operational state from the current state (e.g., replace device state—failure in three months) to a different state (e.g., normal, replace device state—failure in six months).

A visualization is generated regarding the operational performance of the manufacturing device (310). In some implementations, the data determined by the vibration/sound processing apparatuses and the modeling apparatus is stored in the sound data storage device 122 and the vibration data storage 124. This data can then be used by the front-end server 112 of the plant management system 110 to generate visualizations that are presented in an application executing on the operator's device 130. For example, the generated visualizations can provide text and/or graphs (or other graphical information) that use the data stored about a manufacturing device in the storage devices 122 and 124 to provide operational reports specifying the current operational state of the device, the expected operational state of the device, any required adjustment actions, and expected operation of the device over time. An example of such a visualization is shown and described with reference to FIG. 4.

Figure 4:
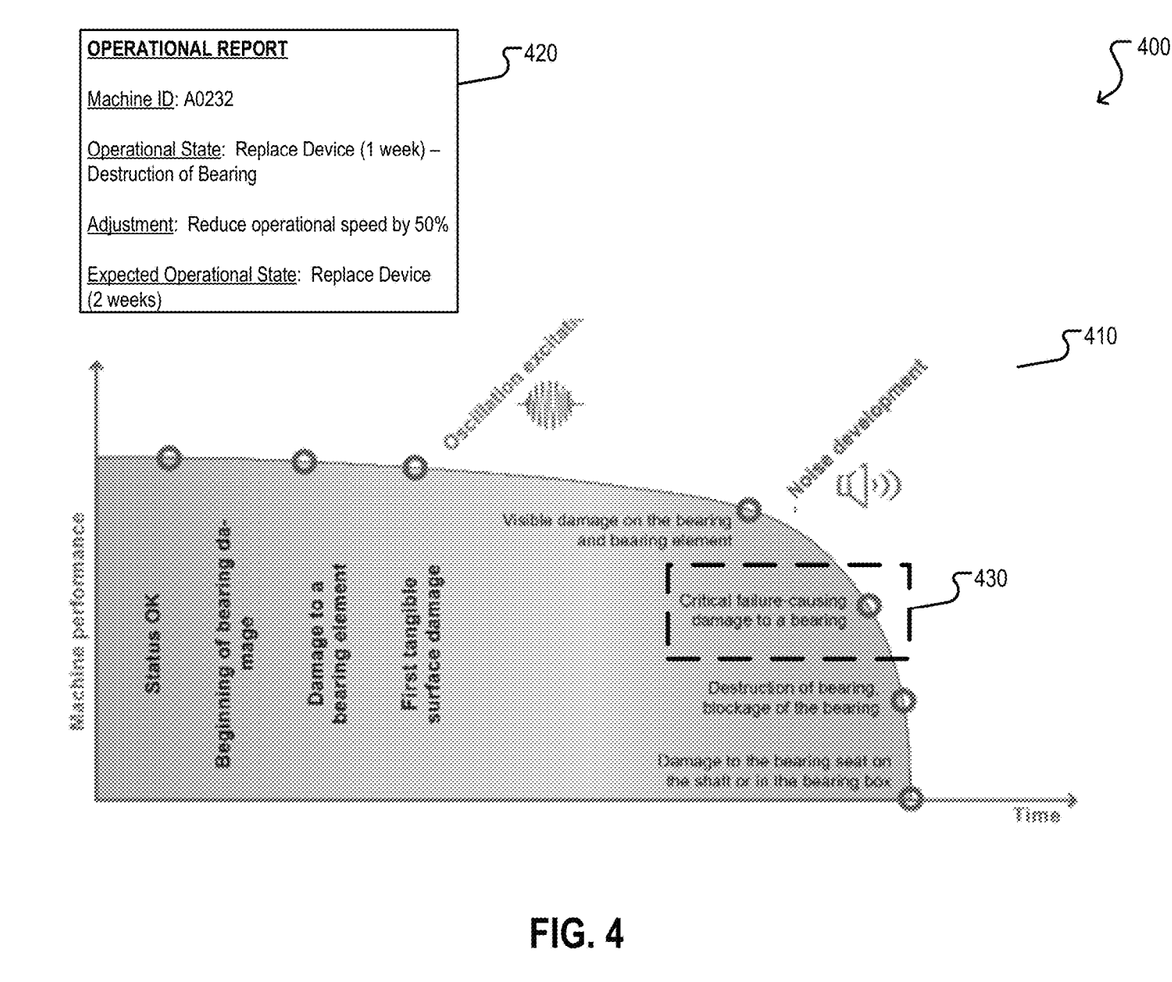
FIG. 4 is an example user interface visualization that is generated for presentation on an operator device.

FIG. 4 is an example user interface visualization 400 that is generated for presentation on an operator device.

The front end server 112 of the plant management system 110 generates the visualization 400 based on the data analyzed and determined by the plant management system 110 (as described above with reference to FIGS. 1 and 2). The visualization 400 include an operational report 420 and a graph 410 showing the operational performance of the manufacturing device over time.

The operation report 420 identifies the manufacturing device by its identifier and includes the current operational state of "Replace Device (1 week)," which is determined by the device state model 216 (as described above with reference to FIGS. 2 and 3). The operational report 420 also identifies the adjustment action ("Reduce operational speed by 50%") and the expected operational state based on the adjustment action ("Replace Device (2 weeks)").

The graph 410 is generated based on the historic operational states stored for the particular manufacturing device. The graph 410 also extrapolates the expected operational performance until the device's expected failure in the future (assuming that the adjustment action is not performed). This future extrapolation can be generated based on known operational performance of other similar devices with similar operation over the lifetime of the devices. The graph 410 also identifies the current operational state 430 and includes additional information about the cause of the issue/defect for the current operational state 430 ("Critical failure-causing damage to a bearing").

Figure 5:
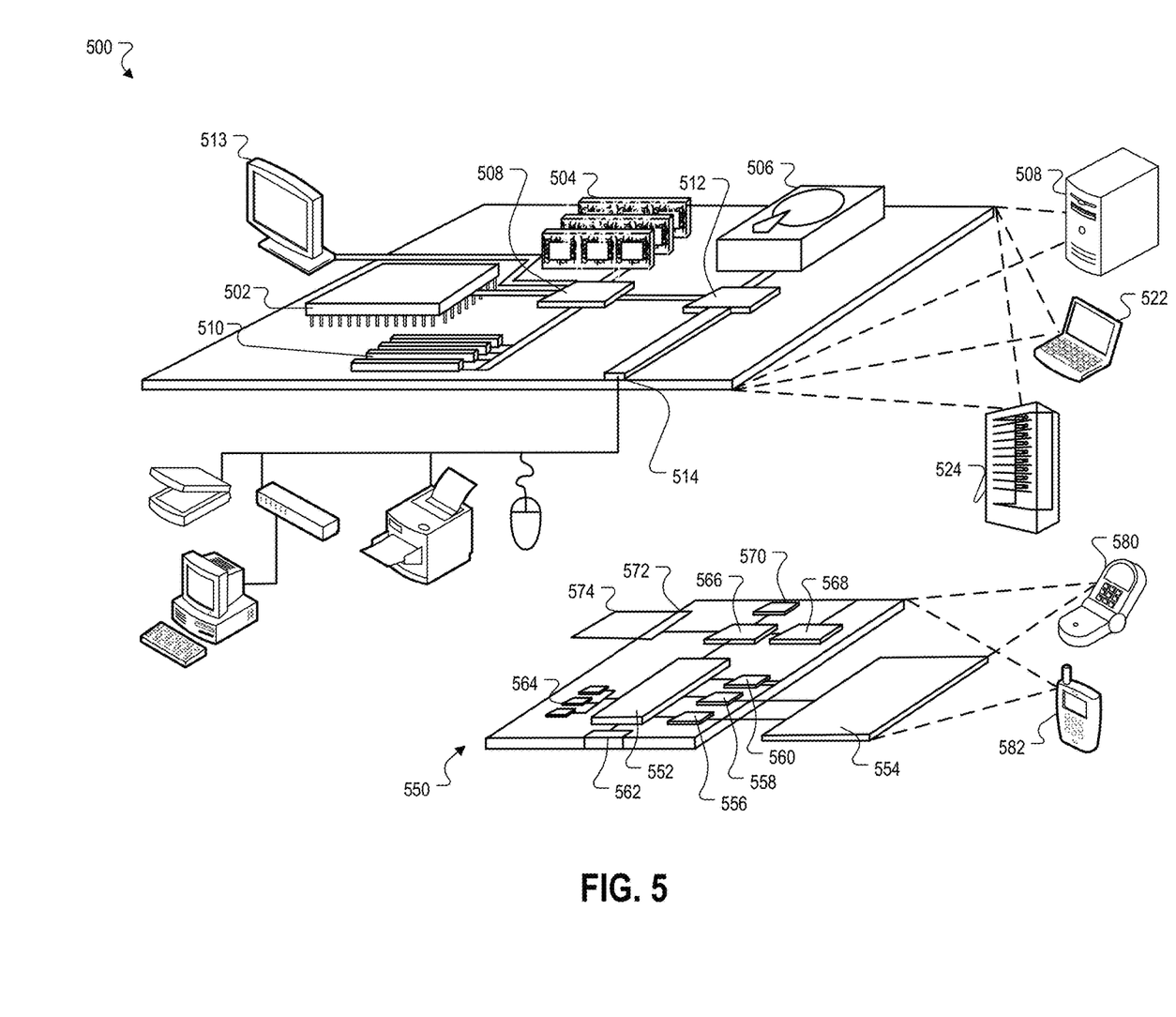
FIG. 5 is a block diagram of a computing system that can be used in connection with methods described in this specification.

FIG. 5 is a block diagram of computing devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 404 is a non-volatile memory unit or units.

The storage device 506 is capable of providing mass storage for the computing device 400. In one implementation, the storage device 506 is a computer-readable medium. In various different implementations, the storage device 506 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate. The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A method comprising:
   obtaining, by one or more computers and from a first set of sensors, vibration data specifying vibration in a manufacturing device during operation of the manufacturing device in a manufacturing plant;
   processing, by the one or more computers, the vibration data to identify a current vibration signature for the manufacturing device;
   determining, by the one or more computers and using the current vibration signature and known vibration signatures, a current operational state of the manufacturing device; and
   adjusting, by the one or more computers and based on the current operational state of the manufacturing device, one or more operational characteristics of the manufacturing device in real time and during operation of the manufacturing device, comprising:
     in response to determining the current operational state is a first operational state of the manufacturing device using the current vibration signature, providing control signals to the manufacturing device for updating one or more first operational characteristics of the manufacturing device to achieve a second operational state; and
     in response to determining the current operational state is a third operational state of the manufacturing device using the current vibration signature, providing controls signals to the manufacturing device for updating one or more second operational characteristics of the manufacturing device to achieve a fourth operational state,
     wherein, the first operational state, the second operational state, the third operational state, and the fourth operational state are different from each other, and wherein the first operational characteristics are different from the second operational characteristics.

2. The method of claim 1, further comprising:
   obtaining, from a second set of sensors, sound data representing sound present in the manufacturing plant;
   processing the sound data to identify a sound signature;
   determining, based on the sound signature and the current vibration signature, the current operational state is a reinforced operational state of the manufacturing device; and
   adjusting one or more third operational characteristics of the manufacturing device based on the reinforced operational state of the manufacturing device.

3. The method of claim 2, wherein the sound data represents sound emanating from the manufacturing device for which the vibration data was collected or a different manufacturing device in the manufacturing plant.

4. The method of claim 1, wherein determining the current operational state of the manufacturing device comprises determining that the current operational state is one of a replace device state, normal operational state, abnormal operational state, predicted failure state, or optimization opportunity state.

5. The method of claim 1, wherein determining, based on the current vibration signature and known vibration signatures, the current operational state of the manufacturing device, comprises:
   inputting the current vibration signature into a device state model, wherein the device state model is trained on (i) historical vibration data and (ii) corresponding operational states of manufacturing devices, and outputs determined operational states of manufacturing devices based on input vibration signatures; and
   obtaining, from the device state model and based on the input current vibration signature, output specifying the current operational state of the manufacturing device.

6. The method of claim 2, wherein determining, based on the sound signature and the current vibration signature, the reinforced operational state of the manufacturing device, comprises:
   inputting the sound signature and the current vibration signature into a device state model, wherein the device state model is trained on (i) historical vibration and sound data and (ii) corresponding operational states of manufacturing devices, and outputs operational states of manufacturing devices based on input vibration and sounds signatures; and
   obtaining, from the device state model and based on the input current vibration signature and sound signature, output specifying the second operational state of the manufacturing device.

7. The method of claim 1, further comprising:
   generating a visualization indicating expected operational performance of the manufacturing device based on the (i) first operational state, (ii) the second operational state, (iii) the third operational state, or (iv) any combination thereof.

8. The method of claim 1, wherein:
   obtaining the vibration data comprises collecting vibration data over a specified period of time;
   processing the vibration data to identify the current vibration signature comprises determining the current vibration signature based on a pattern of vibration attributes over the specified period of time; and
   determining the current operational state of the manufacturing device comprises:
     inputting the current vibration signature into a device state model; and obtaining output from the device state model indicating that the manufacturing device is determined to have the first operational state or the third operational state.

9. The method of claim 1, wherein adjusting the one or more first operational characteristics of the manufacturing device and the one or more second operational characteristics of the manufacturing device comprises:
providing, to the manufacturing device, device adjustment action commands.

10. The method of claim 9, wherein adjusting the one or more first operational characteristics of the manufacturing device and the one or more second operational characteristics of the manufacturing device comprises adjusting physical, electric, and/or digital controls of the manufacturing device.

11. A system comprising:
one or more memory devices storing instructions; and
one or more data processing apparatus that are configured to interact with the one or more memory devices, and upon execution of the instructions, perform operations including:
obtaining, from a first set of sensors, vibration data specifying vibration in a manufacturing device during operation of the manufacturing device in a manufacturing plant;
processing the vibration data to identify a current vibration signature for the manufacturing device;
determining, using the current vibration signature and known vibration signatures, a current operational state of the manufacturing device; and
adjusting, based on the current operational state of the manufacturing device, one or more operational characteristics of the manufacturing device, comprising:
in response to determining the current operational state is a first operational state of the manufacturing device using the current vibration signature, providing control signals to the manufacturing device for updating one or more first operational characteristics of the manufacturing device to achieve a second operational state; and
in response to determining the current operational state is a third operational state of the manufacturing device using the current vibration signature, providing control signals to the manufacturing device for updating one or more second operational characteristics of the manufacturing device to achieve a fourth operational state,
wherein, the first operational state, the second operational state, the third operational state, and the fourth operational state are different from each other, and wherein the first operational characteristics are different from the second operational characteristics.

12. The system of claim 11, wherein the one or more data processing apparatus are configured to perform operations further comprising:
obtaining, from a second set of sensors, sound data representing sound present in the manufacturing plant;
processing the sound data to identify a sound signature;
determining, based on the sound signature and the current vibration signature, the current operational state is a reinforced operational state of the manufacturing device; and
adjusting one or more third operational characteristics of the manufacturing device based on the reinforced operational state of the manufacturing device.

13. The system of claim 12, wherein the sound data represents sound emanating from the manufacturing device for which the vibration data was collected or a different manufacturing device in the manufacturing plant.

14. The system of claim 11, wherein determining the current operational state of the manufacturing device comprises determining that the current operational state is one of a replace device state, normal operational state, abnormal operational state, predicted failure state, or optimization opportunity state.

15. The system of claim 11, wherein determining, based on the current vibration signature and known vibration signatures, the current operational state of the manufacturing device, comprises:
inputting the current vibration signature into a device state model, wherein the device state model is trained on (i) historical vibration data and (ii) corresponding operational states of manufacturing devices, and outputs determined operational states of manufacturing devices based on input vibration signatures; and
obtaining, from the device state model and based on the input current vibration signature, output specifying the current operational state of the manufacturing device.

16. The system of claim 12, wherein determining, based on the sound signature and the current vibration signature, the reinforced operational state of the manufacturing device, comprises:
inputting the sound signature and the current vibration signature into a device state model, wherein the device state model is trained on (i) historical vibration and sound data and (ii) corresponding operational states of manufacturing devices, and outputs operational states of manufacturing devices based on input vibration and sounds signatures; and
obtaining, from the device state model and based on the input current vibration signature and sound signature, output specifying the second operational state of the manufacturing device.

17. The system of claim 11, wherein the one or more data processing apparatus are configured to perform operations further comprising:
generating a visualization indicating expected operational performance of the manufacturing device based on the (i) first operational state, (ii) the second operational state, (iii) the third operational state, or (iv) any combination thereof.

18. The system of claim 11, wherein:
obtaining the vibration data comprises collecting vibration data over a specified period of time;
processing the vibration data to identify the current vibration signature comprises determining the current vibration signature based on a pattern of vibration attributes over the specified period of time; and
determining the current operational state of the manufacturing device comprises:
inputting the current vibration signature into a device state model; and
obtaining output from the device state model indicating that the manufacturing device is determined to have the first operational state or the third operational state.

19. A non-transitory computer readable medium storing instructions that, when executed by one or more data processing apparatus, cause the one or more data processing apparatus to perform operations comprising:
obtaining, by one or more computers and from a first set of sensors, vibration data specifying vibration in a manufacturing device during operation of the manufacturing device in a manufacturing plant;

processing, by the one or more computers, the vibration data to identify a current vibration signature for the manufacturing device;

determining, by the one or more computers and using the current vibration signature and known vibration signatures, a current operational state of the manufacturing device; and adjusting, by the one or more computers and based on the current operational state of the manufacturing device, one or more operational characteristics of the manufacturing device in real time and during operation of the manufacturing device, comprising:

in response to determining the current operational state is a first operational state of the manufacturing device using the current vibration signature, providing control signals to the manufacturing device for updating one or more first operational characteristics of the manufacturing device to achieve a second operational state; and in response to determining the current operational state is a third operational state of the manufacturing device using the current vibration signature, providing controls signals to the manufacturing device for updating one or more second operational characteristics of the manufacturing device to achieve a fourth operational state, wherein, the first operational state, the second operational state, the third operational state, and the fourth operational state are different from each other, and wherein the first operational characteristics are different from the second operational characteristics.

20. The non-transitory computer readable medium of claim 19, further comprising:

obtaining, from a second set of sensors, sound data representing sound present in the manufacturing plant;

processing the sound data to identify a sound signature;

determining, based on the sound signature and the current vibration signature, the current operational state is a reinforced operational state of the manufacturing device; and adjusting one or more third operational characteristics of the manufacturing device based on the reinforced operational state of the manufacturing device.

21. The non-transitory computer readable medium of claim 20, wherein the sound data represents sound emanating from the manufacturing device for which the vibration data was collected or a different manufacturing device in the manufacturing plant.

22. The non-transitory computer readable medium of claim 19, wherein determining the current operational state of the manufacturing device comprises determining that the current operational state is one of a replace device state, normal operational state, abnormal operational state, predicted failure state, or optimization opportunity state.

23. The non-transitory computer readable medium of claim 19, wherein determining, based on the current vibration signature and known vibration signatures, the current operational state of the manufacturing device, comprises:

inputting the current vibration signature into a device state model, wherein the device state model is trained on (i) historical vibration data and (ii) corresponding operational states of manufacturing devices, and outputs determined operational states of manufacturing devices based on input vibration signatures; and obtaining, from the device state model and based on the input current vibration signature, output specifying the current operational state of the manufacturing device.

24. The non-transitory computer readable medium of claim 20, wherein determining, based on the sound signature and the current vibration signature, the reinforced operational state of the manufacturing device, comprises:

inputting the sound signature and the current vibration signature into a device state model, wherein the device state model is trained on (i) historical vibration and sound data and (ii) corresponding operational states of manufacturing devices, and outputs operational states of manufacturing devices based on input vibration and sounds signatures; and obtaining, from the device state model and based on the input current vibration signature and sound signature, output specifying the second operational state of the manufacturing device.

25. The non-transitory computer readable medium of claim 19, wherein the one or more data processing apparatus are configured to perform operations further comprising:

generating a visualization indicating expected operational performance of the manufacturing device based on the (i) first operational state, (ii) the second operational state, (iii) the third operational state, or (iv) any combination thereof.

26. The non-transitory computer readable medium of claim 19, wherein:

obtaining the vibration data comprises collecting vibration data over a specified period of time;

processing the vibration data to identify the current vibration signature comprises determining the current vibration signature based on a pattern of vibration attributes over the specified period of time; and determining the current operational state of the manufacturing device comprises:

inputting the current vibration signature into a device state model; and obtaining output from the device state model indicating that the manufacturing device is determined to have the first operational state or the third operational state.

* * * * *